Figure 1:
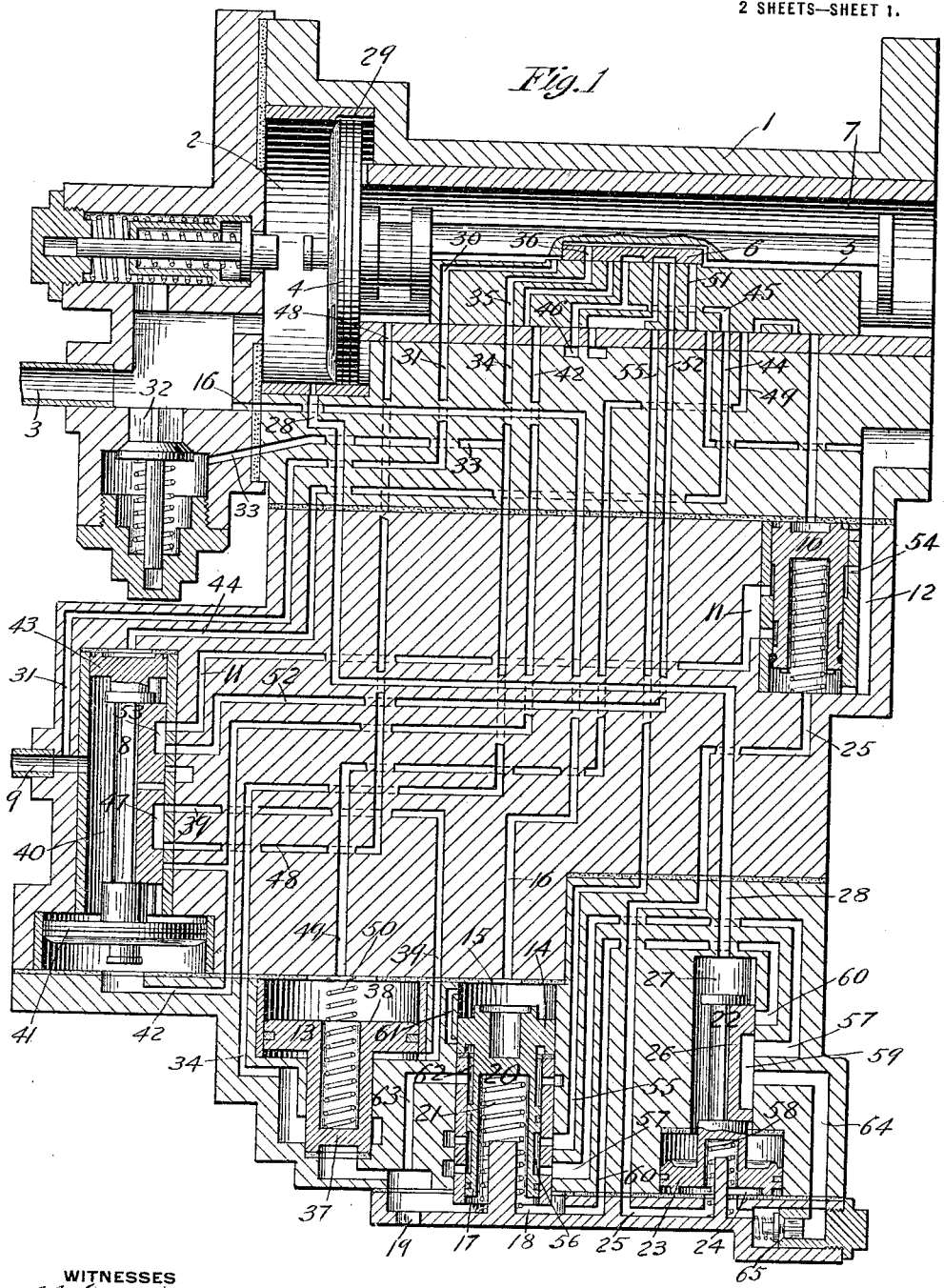

W. V. TURNER.
RELIEF VALVE DEVICE.
APPLICATION FILED SEPT. 20, 1911.

1,139,602.

Patented May 18, 1915.
2 SHEETS—SHEET 1.

WITNESSES
R. C. Swartzwelder
H. C. Donaldson

INVENTOR
Walter V. Turner
by Wm. H. Cady
Att'y.

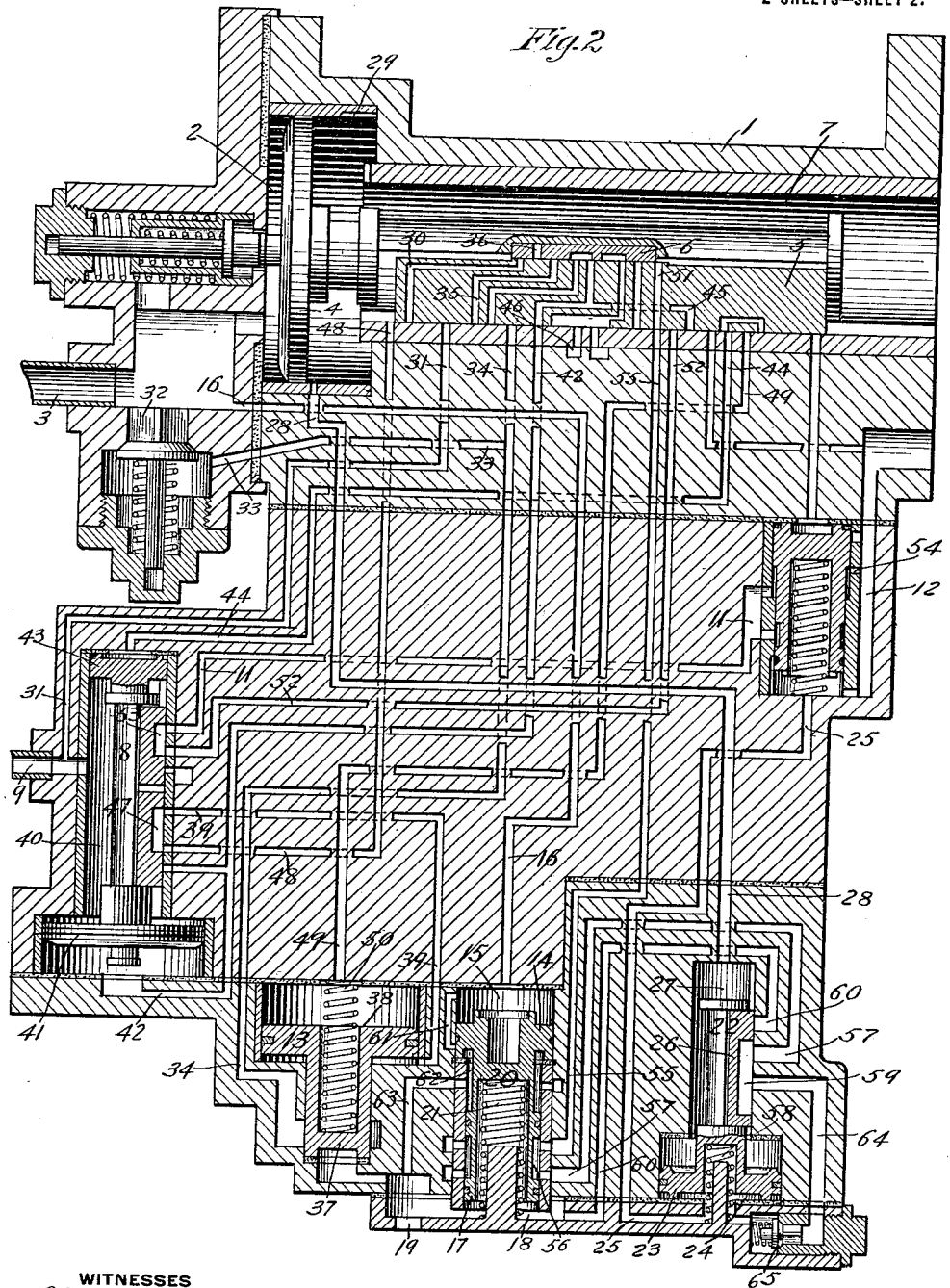

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

RELIEF-VALVE DEVICE.

1,139,602.  Specification of Letters Patent.  Patented May 18, 1915.

Application filed September 20, 1911. Serial No. 650,483.

*To all whom it may concern:*

Be it known that I, WALTER V. TURNER, a citizen of the United States, residing at Edgewood, in the county of Allegheny and State of Pennsylvania, have invented new and useful Improvements in Relief-Valve Devices, of which the following is a specification.

This invention relates to fluid pressure brakes, and is more particularly in the nature of an improvement upon the construction covered in my prior application, Serial No. 599,568, filed Dec. 27, 1910.

As to certain features, the invention has reference more particularly to a type of triple valve device having what is termed a second service position, to which the triple valve moves, after equalization of the auxiliary reservoir into the brake cylinder, and in which position air is vented from the auxiliary reservoir upon further gradual reductions in train pipe pressure below equalization so as to prevent movement to emergency position. When the train pipe pressure has been thus reduced to a predetermined low degree, the further venting of air from the auxiliary reservoir is cut off and under this condition it is often desirable to obtain an emergency application of the brakes with certainty.

One object of my invention is to provide means adapted upon a predetermined reduction in train pipe pressure to positively bring about an emergency application of the brakes regardless of whether the rate of train pipe reduction is high or low and even if a heavy brake cylinder leakage happens to exist.

Another object of my invention is to provide an improved valve mechanism for controlling the action of the parts in second service position.

In the accompanying drawings; Figure 1 is a diagrammatic central sectional view of a triple valve device embodying my invention, showing the parts in normal release position; and Fig. 2 a similar view, showing the parts in second service position when the movement to said position is accidental.

My improvements are especially adapted for use where an additional source of fluid under pressure is employed for securing a higher brake cylinder pressure in an emergency application than can be obtained in a service application of the brakes and the triple valve device shown in Figs. 1 and 2 is of this type and comprises a casing 1 having a piston chamber 2 connected to train pipe 3 and containing the usual triple valve piston 4. Said piston is adapted to operate the main slide valve 5 and the graduating valve 6 both contained in valve chamber 7 which is connected to the auxiliary reservoir, as usual.

A valve mechanism 8, operating upon movement of the triple valve piston to emergency position, controls the supply of fluid from a supplemental reservoir or other additional source of fluid under pressure, connected to pipe 9, to the brake cylinder, an intercepting valve device 10 being interposed, however, between the supplemental reservoir supply passage 11 and the brake cylinder passage 12, in order to first supply air from the auxiliary reservoir and then from the supplemental reservoir to the brake cylinder. A quick action valve mechanism 13 is also provided for locally reducing the train pipe pressure in an emergency application of the brakes.

In addition to the above parts, I provide, according to my invention, a piston valve device 20 having differential areas, the larger piston head 14 being contained in piston chamber 15 connected by passage 16 directly to the train pipe and the smaller head 17 being contained in piston chamber 18 constantly open to an atmospheric exhaust port 19.

The piston valve device 20 is subject to the pressure of a spring 21 adapted to shift said valve device to its opposite position upon a reduction in train pipe pressure to a predetermined low degree. A valve mechanism 22 is also provided, comprising a piston 23 contained in piston chamber 24 connected by passage 25 with the brake cylinder passage 12 and a slide valve 26 adapted to be operated by said piston and contained in valve chamber 27 connected by passage 28 to a port opening controlled by the triple valve piston 4.

Air supplied to the train pipe moves the triple valve piston 4 to release position and the auxiliary reservoir is charged through feed groove 29 in the usual manner. Air also flows from valve chamber 7 through port 30 and passage 31 to pipe 9, charging the supplemental reservoir with fluid under pressure. Fluid from the train pipe also flows past check valve 32 into passage 33 and thence through passage 34 and ports 35 and 36 to the valve chamber 7 and the auxiliary reservoir. Passage 34 leads to train pipe vent valve 37, so that when said valve is opened, air is vented from the train pipe to the atmospheric exhaust port 19.

The chamber below emergency quick action piston 38 is connected by passage 39 to valve chamber 7.

Air from the supplemental reservoir flows from valve chamber 40 around by-pass piston 41, and as passage 42 is now closed by slide valve 5, the fluid pressure in the chamber below said piston equalizes with the pressure in valve chamber 40, and the small piston 43 being open to the atmosphere through passage 44, cavity 45, and exhaust port 46, the excess pressure on piston 41 shifts the by-pass valve mechanism 8 to the position shown in Fig. 1. In this position, passage 39 is connected by cavity 47 with passage 48 which opens into valve chamber 7, so that the under side of piston 38 is charged with fluid under pressure, and as passage 49 is closed by the slide valve 5, fluid pressures equalize on opposite sides of the piston 38, thus permitting the spring 50 to hold the valve 37 closed.

Fluid at train pipe pressure supplied through passage 16 to chamber 15 acts on piston 14 and when the same slightly exceeds the pressure of spring 21, the piston valve device 20 is shifted to its lower position. In release position and service application position, air is supplied from the train pipe through passage 28 to valve chamber 27, and as piston chamber 24 is connected to the brake cylinder through passage 25, the valve mechanism 22 is shifted to its lower position, as shown in Fig. 1.

Upon a gradual reduction in train pipe pressure, the triple valve piston 4 is shifted to service application position and fluid from the auxiliary reservoir is supplied to the brake cylinder through port 51, passage 52, cavity 53, passage 11 and port 54, as usual with this type of valve mechanism.

If the train pipe pressure becomes reduced by gradual reductions in train pipe pressure below the equalization point, the triple valve piston will be shifted to the second service position, as shown in Fig. 2, in which position, service port 51 registers with passage 55, and until the train pipe pressure has reduced to a predetermined low degree, passage 55 is connected through an annular groove 56 in the piston valve device 20 with a passage 57, leading to the seat of valve 26. The brake cylinder and auxiliary reservoir having equalized, as above stated, the opposing fluid pressures on piston 23 are also equalized, as the valve chamber 27 is connected to the auxiliary reservoir upon movement of the triple valve piston 4 beyond the first service position, so that spring 58 operates to shift the valve mechanism 22 to its upper position, in which passage 57 is connected by cavity 59 with passage 60 leading to chamber 18.

Air is thus vented from the auxiliary reservoir in the second service position until the pressure therein has been reduced sufficiently to cause the train pipe pressure on piston 4 to shift the same and the graduating valve 6 to close the port 51. In a similar manner, air is vented from the auxiliary reservoir upon further gradual reductions in train pipe pressure until the train pipe pressure has been reduced to the point at which the pressure of the spring 21 exceeds the train pipe pressure in chamber 15, then the piston valve device is shifted to its upper position, in which the passage 55 is cut off from passage 57, so that fluid can no longer be vented from the auxiliary reservoir. Under this condition, the triple valve piston 4 is shifted by any further reduction in train pipe pressure to emergency position thus producing an emergency application of the brakes.

According to my present invention, a cavity 61 is adapted, in the upper position of the piston head 14, to connect train pipe passage 16 with the atmosphere through annular groove 62 and passage 63 to exhaust port 19, so that the train pipe pressure is suddenly reduced by locally venting to the atmosphere. This feature of my invention is highly important, because it sometimes happens that in the second service position, the train pipe pressure does not reduce at a sufficient rate to insure the movement of the triple valve piston 4 to emergency position, for instance, the auxiliary reservoir pressure may reduce at the same time by leakage around the piston 4 to the train pipe, or there may be a sufficient brake cylinder leakage to keep the auxiliary reservoir pressure down below the train pipe pressure. By venting fluid from the train pipe at this critical point, a positive differential in pressures is created on the piston 4 which insures its movement to emergency position.

It will noted that upon movement of the piston 14 to its upper seat, communication from the train pipe to the exhaust is closed, so that the train pipe pressure is not reduced below a predetermined degree and further that when the piston 14 is seated in its upper position, only a restricted area thereof is exposed to train pipe pressure, and consequently, when the train pipe pressure is increased to a predetermined degree, the piston 14 lifts from its seat and a larger area being then exposed to train pipe pressure, the positive and prompt opening of the valve device 20 is secured.

Should the triple valve parts accidentally move over past the usual service position directly to the second service position before equalization of the auxiliary reservoir into the brake cylinder, the higher auxiliary reservoir pressure in valve chamber 27 acting in opposition to the brake cylinder pressure below the piston 23 will hold the valve mechanism 22 in its lower position, in which cavity 59 connects passage 57 with a passage 64 containing a check valve 65 and opening into passage 25. It will thus be seen that under this condition, fluid from the auxiliary reservoir is vented to the brake cylinder through passage 25 instead of to the atmosphere and when the auxiliary reservoir pressure has been reduced by flow to the brake cylinder, in the second service position, to a degree slightly less than the reduced train pipe pressure, the triple valve piston 4 actuates the graduating valve to close the service port 51 as before. Further reductions in train pipe pressure cause the operation of the triple valve piston to open the port 51 and supply more fluid to the brake cylinder until the auxiliary reservoir pressure has been reduced to the equalization point, when the valve mechanism 22 shifts to its upper position and air is then vented from the auxiliary reservoir to the atmosphere upon further reductions in train pipe pressure. As heretofore described, upon the train pipe pressure being reduced to the predetermined degree for which the piston valve 20 is adjusted, the communication for venting air from the auxiliary reservoir to the atmosphere is cut off and an emergency application is produced upon a further reduction in train pipe pressure.

So far as the last described feature of my invention is concerned, the second service position need not be employed, as the valve mechanism 22 can be arranged to operate in the usual service application position, in which case the passage 55 should open into the passage 52 instead of leading to the seat of the slide valve 5, and the passage 28 should be arranged to open to the auxiliary reservoir upon movement of the triple valve piston to the usual service position.

The feature of effecting a sudden local venting of fluid pressure from the automatic valve device when the train pipe pressure reduces to a predetermined degree is adapted for use with the usual standard brake equipment, and also in various forms of brake apparatus wherein there is liability of the triple valve piston failing to go to emergency position owing to leakage and the like.

Having now described my invention, what I claim as new and desire to secure by Letters Patent, is:—

1. In a fluid pressure brake, the combination with a train pipe, a pressure chamber, and a valve device subject to the opposing pressures of the train pipe and pressure chamber and operated by a differential in pressures between the train pipe and chamber for effecting an application of the brakes, of a valve mechanism controlling communication through which fluid is supplied to apply the brakes and adapted upon a predetermined reduction in train pipe pressure to close said communication and vent fluid from the train pipe.

2. In a fluid pressure brake, the combination with a train pipe, an auxiliary reservoir, and a valve device subject to the opposing pressures of the train pipe and auxiliary reservoir and operated by a reduction in train pipe pressure to a degree less than the auxiliary reservoir pressure for effecting an application of the brakes, of a valve mechanism controlling communication through which fluid is supplied to the brake cylinder and a train pipe vent port and adapted upon a predetermined reduction in train pipe pressure to close said communication and vent fluid from the train pipe to effect the movement of said valve device to a position for applying the brakes.

3. In a fluid pressure brake, the combination with a train pipe, an auxiliary reservoir, and a valve device having a piston subject to the opposing pressures of the train pipe and auxiliary reservoir and operating upon a gradual reduction in train pipe pressure for effecting a service application of the brakes and upon a sudden reduction in train pipe pressure for effecting an emergency application of the brakes, of a valve mechanism controlling communication through which fluid is supplied to the brake cylinder and operating upon a predetermined reduction in train pipe pressure for closing said communication and for effecting a sudden reduction in train pipe pressure, and thereby the movement of said valve device to emergency position.

4. In a fluid pressure brake, the combination with a train pipe, pressure chamber, and a valve device subject to the opposing pressures of the train pipe and pressure chamber and adapted to supply fluid to the brake cylinder upon a reduction in train pipe pressure, of a valve mechanism subject to the opposing pressures of the auxiliary reservoir and brake cylinder and adapted normally to provide communication for supplying fluid from the pressure chamber to the brake cylinder and operating upon equalization of the pressure chamber into the brake cylinder to close communication from the pressure chamber to the brake cylinder and open communication from the pressure chamber to the atmosphere.

5. In a fluid pressure brake, the combination with a train pipe, and a valve device operated upon a reduction in train pipe pressure for supplying fluid through a supply passage to the brake cylinder, of a valve mechanism subject to the opposing pressures of the train pipe on one side and the pressure of a spring and atmospheric pressure on the opposite side for controlling communication through said passage and valve means subject to the opposing pressures of the auxiliary reservoir and brake cylinder for also controlling communication through said passage to the brake cylinder and adapted upon equalization of the auxiliary reservoir and brake cylinder pressures to connect said supply passage to the atmosphere.

6. In a fluid pressure brake, the combination with a train pipe, auxiliary reservoir, and a valve device subject to the opposing pressures of the train pipe and auxiliary reservoir for supplying fluid through a supply passage to the brake cylinder, of a valve mechanism subject on one side to train pipe pressure and on the opposite side to atmospheric pressure and the pressure of a spring for normally opening communication through said passage and operating upon a predetermined reduction in train pipe pressure for closing said communication and valve means subject to the opposing pressures of the auxiliary reservoir and brake cylinder for normally opening communication through said passage to the brake cylinder and adapted upon equalization of the auxiliary reservoir pressure into the brake cylinder to close said communication and connect said supply passage to the atmosphere.

7. In a fluid pressure brake, the combination with a train pipe, of a valve device subject to the opposing pressures of the train pipe and a spring for controlling a communication for venting fluid from the train pipe and adapted to seat and close said communication upon movement in opposite directions, said communication being open during the movement between the seats.

8. In a fluid pressure brake, the combination with a train pipe, of a piston subject to the opposing pressures of the train pipe and a spring and adapted to seat upon movement in either direction and a port for establishing communication from the train pipe to an exhaust port upon movement of said piston from either seat.

9. In a fluid pressure brake, the combination with a train pipe, of a piston subject on one side to train pipe pressure and on the opposite side to atmospheric pressure and the pressure of a spring, and a port controlled by said piston for venting fluid from the train pipe, said piston being moved upon a predetermined increase in train pipe pressure to a seat for closing said port and adapted upon a predetermined reduction in train pipe pressure for first opening said port and for finally seating to close said port.

In testimony whereof I have hereunto set my hand.

WALTER V. TURNER.

Witnesses:
WM. M. CADY,
T. L. RAFTERY.

Copies of this patent may be obtained for five cents each, by addressing the "Commissioner of Patents, Washington, D. C."